Figure 1:
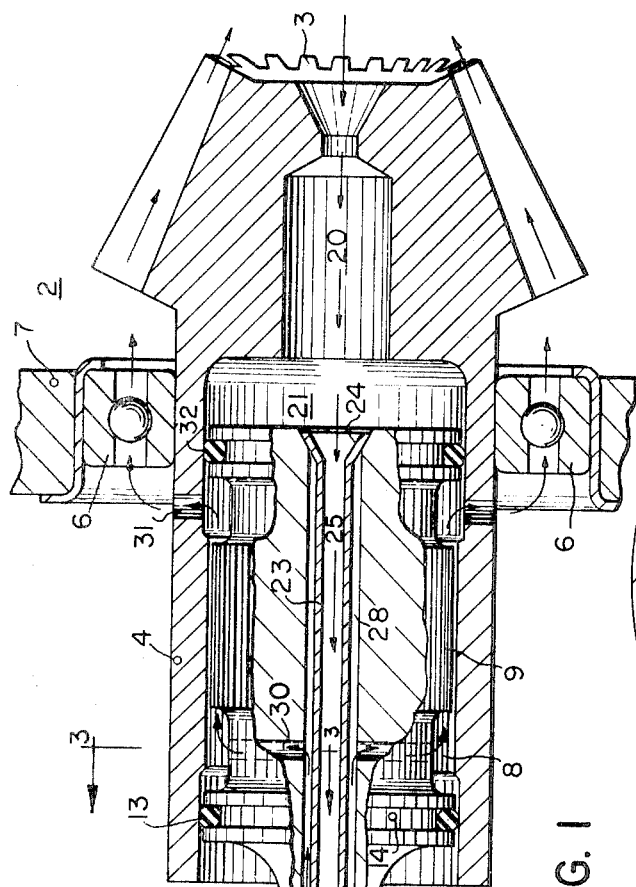

United States Patent

Butterfield et al.

[15] 3,637,049
[45] Jan. 25, 1972

[54] CONTINUOUS, SELF-PUMPING LUBRICATIONS SYSTEM FOR SPLINED SHAFTS

[72] Inventors: John L. Butterfield; George E. Brissey, both of Erie, Pa.

[73] Assignee: General Electric Company

[22] Filed: Mar. 3, 1970

[21] Appl. No.: 16,009

[52] U.S. Cl. ........................................... 184/6.12, 184/6.28
[51] Int. Cl. ................................................ F16n 7/36
[58] Field of Search ................... 184/6 TT, 8, 6 R, 6 TS, 7 R, 184/12, 1; 60/39.08

[56] References Cited

UNITED STATES PATENTS

| | | | |
|---|---|---|---|
| 2,457,999 | 1/1949 | Hulbert | 184/6 TS |
| 2,693,248 | 11/1954 | Gaubatz et al. | 184/6 TS |
| 3,075,349 | 1/1963 | Bill et al. | 60/39.08 |
| 3,380,555 | 4/1968 | Myers et al. | 184/6 TT |

FOREIGN PATENTS OR APPLICATIONS

| | | | |
|---|---|---|---|
| 1,447,322 | 6/1966 | France | 184/6 TT |
| 151,616 | 11/1921 | Great Britain | 184/6 TT |
| 718,449 | 11/1954 | Great Britain | 60/39.08 |

*Primary Examiner*—Manuel A. Antonakas
*Attorney*—I. David Blumenfeld, Frank L. Neuhauser, Oscar B. Waddell and Joseph B. Forman

[57] ABSTRACT

A lubrication system for a splined shaft is described in which rotation of the shaft produces a continuous pumping action of the lubricant through the splines. A central bore is formed in the stub shaft. A hollow tube of smaller diameter than the bore is positioned in the bore forming an annular passage between the tube and the shaft bore. Radial holes at opposite ends of the shaft communicate between the exterior of the shaft and the annulus to provide a return path for the oil. Rotation of the shaft and the radial holes produce a pumping action which pumps the lubricant through the tube and the splines and back into the annular return passage and out the other radial hole to produce continuous pumping of the oil through the shaft splines.

8 Claims, 3 Drawing Figures

PATENTED JAN 25 1972

3,637,049

INVENTORS
GEORGE E. BRISSEY
JOHN L. BUTTERFIELD
BY David Blumenfeld
ATTORNEY

CONTINUOUS, SELF-PUMPING LUBRICATIONS SYSTEM FOR SPLINED SHAFTS

This invention relates to a lubricating system, and more particularly, to a continuous, self-lubricating system for a rotating shaft.

Although the instant invention will be described in connection with a self-lubricated spline shaft for an aircraft generator system simply because the problem of spline wear is a cause of serious concern there, it will be understood and appreciated by those skilled in the art that the invention is not limited thereto and may be used in any environment where a self-pumping, lubricating system for a spline or gear system is desirable.

Adequate lubrication of the splined shaft for aircraft generators and accessory equipment is a continuing problem. Typically, in an aircraft application, the generator is driven from a power source such as the aircraft engine in through a gearbox and a splined shaft arrangement. Aircraft generators and engines may be operated over a wide range of speeds, with speeds greater than 20,000 revolutions per minute being not at all unusual. At such speeds, they may be subject to severe vibration so that lubricating the spline surface of the shafts can be a difficult problem. Not only is it important that a suitable lubricant be continuously supplied to the spline surfaces, but these surfaces are also subject to additional wear due to the wear particles which may collect at the spline surfaces. Thus, the preferred system is one in which a lubricant is continuously supplied to the splined surface and under sufficient pressure to produce a flushing action at the surface of the splines to remove any particles which collect there. The system must, of course, also be highly reliable since any failure of the lubricant supply can cause serious damage.

In the past, pressurized oil systems as well as grease-packed systems have been utilized. In the pressurized system, the lubricating oil is supplied to the shaft under sufficient pressure to force the oil to the splined surfaces. In grease-packed systems grease lubricant is located at or near the spline surfaces to provide the needed lubrication. Both of these systems are effective to a certain extent in providing adequate lubrication. However, they are subject to a number of difficulties which, in some circumstances, severely limited their utility. Thus, the pressurized oil systems usually require an external oil pump to provide the oil at sufficiently high pressures to get them to the spline surface. Obviously, this adds cost, and weight to the system in that a separate pump of sufficient capacity to produce the desired oil pressure must be furnished. In aircraft applications where weight and space are important considerations, this is considered a serious drawback. Furthermore, since the oil is supplied at high pressure, the problems of leakage at gaskets and O-ring sealing points is always present and can, under certain circumstances, provide serious problems. In addition, failure of the oil pump can have catastrophic results in that lubrication of the splined surfaces is interrupted. Similarly, with grease systems, failure of the lubricating properties of the grease can cause substantial problems.

It is therefore, a primary objective of the instant invention to provide a continuous self-lubricating system for the splined surfaces of a shaft in which rotation of the shaft itself pumps oil to the spline surfaces.

Another objective of the invention is to provide a self-lubricating system for a splined shaft which is simple in construction, highly reliable in operation, and minimizes the weight of and space occupied by the system.

Other objectives and advantages of the invention will become apparent as the description thereof proceeds.

The various objectives and advantages of the invention are realized, by means of a stub shaft construction in which rotation of the shaft provides the desired pumping action of the lubricant through the center of the shaft and through the spline surfaces. Oil from the sump or the gearbox is caused to flow through the assembly over the spline and back to an annular return passage in the shaft through the pumping action produced by radial holes extending from the outside of the shaft to the return passage. The dimensions of these radial holes is such, in terms of the relative distance from the axis of rotation, that the oil is pumped through the center of the shaft over the splines and then back through the annular passage and out of the shaft. Thus, rotation of the shaft produces the desired pumping action on the oil and insures that oil is furnished to the splined surfaces as long as the shaft is rotating thereby eliminating the need for pumps or to other accessories to provide oil under pressure.

Other features believed characteristic of this invention are set forth with particularity in the appending claims. The invention itself, however, together with many objects and advantages thereof will be best understood by reference to the following description taken in conjunction with the accompanying drawing in which:

FIG. 1 is a partial sectional view of a stub shaft constructed according to the invention.

Figure 3:
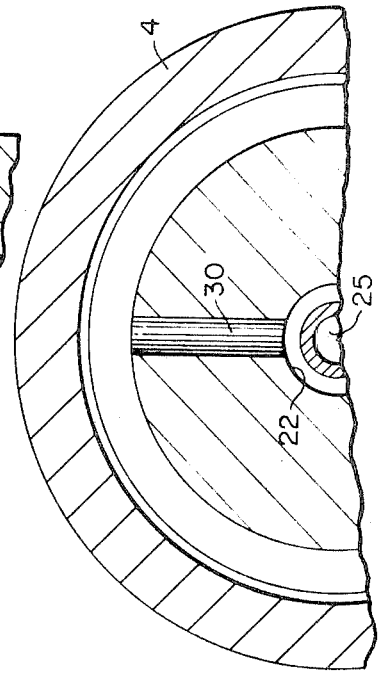
Figure 2:
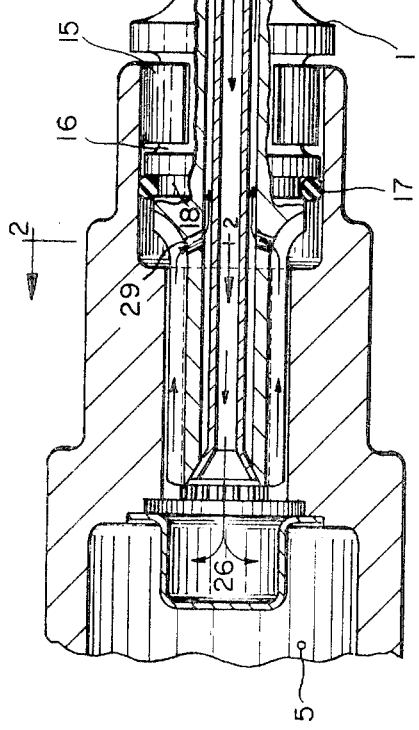

FIGS. 2 and 3 are partial sectional views taken along lines 2—2 and 3—3 of FIG. 1.

FIG. 1 illustrates a stub shaft constructed in accordance with the instant invention in which rotation of the stub shaft pumps lubricating oil through and around the shaft to provide continuous lubrication of the splines without requiring oil under high pressure from an external source. The splined stub shaft, shown generally at 1 is coupled between a driving member 2, shown as a pinion gear 3 having a hollow internally splined shaft portion 4, and a driven member 5 which is also shown as a hollow internally splined shaft. Pinion gear 3 engages any suitable driving gear not shown, which is coupled to a source of motive power which, in the case of an aircraft electrical system, may be the engine of the aircraft. Shaft 5, on the other hand, is connected to the driven member which may be a generator. Pinion gear shaft 4 is mounted in suitable bearings 6 which are secured to a housing 7, which may be part of a gearbox or the like. Shaft 4 rotates in bearings 6 to transmit power from the driving source through stub shaft 1 and generator shaft 5 to the generator or any other utilization device. Drive shaft 4 is hollow and contains a spline section section 8 which mates with the splines 9 on one end of the stub shaft. The other end of stub shaft 1 has a spline section 10 which mates with a set of corresponding splines 11 in the interior of generator shaft 5. The diameter of the oil inlet holes 29 in stub shaft 1 are smaller than the outlet holes 30 in the portion of the stub shaft engaging the hollow shaft of pinion gear 3. This difference in the diameters is necessary to produce continuous pumping of the lubricating oil with shaft rotation. To this end, a diameter reducing neck portion 12 is furnished between the two spline sections of the shaft to allow for the desired dimensional relationship.

Each of the splined sections of stub shaft 1 and shafts 4 and 5 are assembled in a liquidtight relationship to prevent the lubricant which is pumped through the splines from leaking out. Thus, splines 8 and 9 which couple stub shaft 1 and pinion gear shaft 4 spline sections are sealed in fluidtight relationship by means of an O-ring 13 retained in O-ring channel 14. Similarly, spline sections 10 and 11 are sealed against axial movement by a resilient C-ring 15 retained in a C-ring channel 16 and against leakage by an O-ring 17 positioned in O-ring channel 18. The pinion end of stub shaft 1 is sealed with O-ring 32 which may be of smaller diameter than shown and a shoulder on the interior of the hollow pinion shaft may be provided to seal against the O-ring to prevent incoming oil from going out radial holes 31 and thus bypassing inlet oil passage 25.

Lubrication for the stub shaft and splines is provided by an arrangement in which a lubricant such as oil is brought in from the exterior, through the center of the stub shaft and forced through the splines and back out through the pumping action produced by a plurality of radial holes extending through the shaft. The radial holes are so positioned relative to the axis of rotation of the shaft that the centrifugal forces produced by rotation of the stub shaft result in a pumping effect on the oil so that positive, continuous self-lubrication of the shaft splines is achieved without requiring an external high-pressure pump. Lubricating oil from a source not shown, is supplied to the assembly through a bore 20 in pinion gear 3. Bore 20 communicates with a chamber 21 formed between the pinion gear and the end of stub shaft 1. The oil entering chamber 21 is at a very low pressure, i.e., at a pressure which is just sufficient to permit passage of the oil through bore 20 into chamber 21.

The oil in chamber 21 is forced through the stub shaft and the splines through a pumping action produced by rotation of stub shaft 1. Stub shaft 1 has a central bore 22 extending along its entire length. A tube 23 which has a diameter smaller than that of the shaft bore is positioned in the bore. Tube 23 is flared at its ends to form flanges 24 which are fastened to the end of the bore either by brazing, swaging or any other suitable means. Tube 23 thus defines a central oil inlet passage 25 which extends through the shaft from chamber 21 to a chamber 26 formed by an oil-retaining cup 27 fastened to generator shaft 5. The oil passes through the oil inlet passage into chamber 26 and then through spline sections 10 and 11. An annular oil return passage 28 is formed between tube 23 and central bore 22 and communicates with radial oil return holes 29 and 30 drilled through the wall of stub shaft 1 at both ends of the shaft adjacent to the spline sections. Radial holes 29 permit passage of the lubricating oil into the annular oil return passage 28 after flowing through splines 10 and 11. Radial oil holes 30 extend from the annular oil return passage to the exterior of the stub shaft in the vicinity of the splines 8 and 9. Radial oil holes 30 (as may be seen most clearly in FIG. 3) extend further from the center of rotation of the stub shaft than radial holes 29 so that for a given shaft r.p.m., the peripheral velocity at the top of radial holes 30 exceed the velocity at the surface of radial holes 29. Hence, the centrifugal forces acting on the fluids at the surface of radial holes 30 is sufficiently greater than those acting on the fluid at oil pump holes 29 to produce a positive pumping action which forces the oil through holes 30 through splines 8 and 9 and into a chamber 21 formed between O-ring 32 and the splines 8 and 9. The oil is pumped out of this chamber through radial holes 31 in pinion shaft 2 and then is returned through bearings 6 and pinion gears 3 back to the external source.

It will be obvious, therefore, that the rotation of the stub shaft produces a self-lubricating action in which the oil is brought into chamber 21, pumped through oil passage 25, through the splines 10 and 11 back through annular oil return passage 28 and oil pump holes 30 to splines 8 and 9. In this fashion, oil is pumped positively as long as the stub shaft 1 is rotating thereby lubricating the splines surfaces as well as providing a flushing action to remove any particles from splined surfaces.

It will be obvious from the previous description that this arrangement has a number of very positive advantages by virtue of the positive lubricating and flushing action which may be achieved at the spline surfaces. These advantages flow from the pumping action produced by rotation of the stub shaft to be lubricated rather than depending upon the presence of an external pumping mechanism. Obviously, this virtually eliminates any risk that the lubricant supply will be lost due to failure of an external pumping device for as long as the shaft is rotating positive self-lubrication of the splined surfaces will always be available. Furthermore, the saving in space and weight may be significant since there is no longer a need for a pump sufficiently large to force the lubricant through the spline surfaces.

It will also be appreciated by those skilled in the art that the particular relationship of the oil-pumping radial holes may be modified and varied. As long as the oil outlet holes are at a larger radius than the oil inlet hole a positive pumping action will be obtained. Thus, for example, in FIG. 1 the radial oil holes 29 adjacent to the splines 10 and 11 are shown at an angle to the axis of rotation. Obviously, the invention is not limited to an arrangement like this in that the radial holes may be drilled at right angles to the axis of rotation if desired. Furthermore, the precise location of these oil holes is not critical in that other positions may be chosen just as long as the relative dimensions and positions are such that the positive pumping action will result.

The particular stub shaft illustrated in FIG. 1 is shown as being coupled to and driven from a pinion gear arrangement thus requiring lubrication of two separate sets of splines. Obviously, the stub shaft may be driven directly using a different coupling than the one shown in FIG. 1 without going beyond the scope of the invention.

Thus, while one particular embodiment of the invention has been shown and described, it will, of course, be understood that the invention is not limited thereto since modifications may be made in the arrangement shown and employed, and it is contemplated in the appended claims to cover any such modifications as fall within the true spirit and scope of the invention.

What is claimed as new and desired to be secured by Letters Patent of the United States is:

1. In a self-lubricated spline shaft arrangement, the combination comprising,
   a. a shaft having at least one splined portion engaging a corresponding splined portion on a member mating with the shaft,
   b. an oil inlet passage extending axially along said shaft,
   c. means defining an annular oil return passage extending along said shaft,
   d. first radial oil hole means at one end of said shaft communicating between the exterior of the shaft and the annular oil return passage,
   e. second radial oil hole means at the other end of said shaft communicating between the exterior of said shaft and the annular oil return passage, said first and second radial oil hole means having different radii whereby rotation of said shaft produces a positive pumping action and oil flows along the inlet passage (to the exterior of the shaft and back through the annular passage through the oil holes) through the splined portion of the shaft and through one of said radial oil passage means to said annular oil return passage in a direction from the oil passage having the smaller radius to the oil passage means having the larger radius thereby forcing oil through the shaft splines.

2. The shaft arrangement according to claim 1 wherein one of said radial oil hole means is located adjacent to the splined portion to enhance flow of the oil through the splined portion.

3. The shaft arrangement according to claim 1 wherein each of said radial oil hole means includes a plurality of oil holes.

4. The shaft arrangement according to claim 1 including an enclosure means at one end of said shaft whereby said oil passes through said oil inlet passage and into said enclosure means through the splined portion of the shaft and through one of said radial oil hole means to said annular passage.

5. The shaft arrangement according to claim 1 in which said shaft has an axial bore extending therethrough, tube means positioned in said bore, the ends of said tube means being attached to the walls of said tube means to define a central oil inlet passage and said annular oil return passage.

6. The shaft arrangement according to claim 1 including oil-sealing means between the exterior of said shaft adjacent the splined portion and the member mating with said shaft.

7. The shaft arrangement according to claim 6 wherein said sealing means consists of at least one O-ring.

8. The shaft arrangement according to claim 1 comprising a shaft having spline portions at opposite ends thereof, said first and second radial oil hole means being positioned adjacent to said splined portions.

* * * * *